(No Model.)

H. A. ROWLAND.
APPARATUS FOR GRINDING SCREWS.

No. 272,480. Patented Feb. 20, 1883.

Witnesses
D'Arcy Paul
James L. Stewart

Inventor
Henry A. Rowland
per Arthur Stewart
Attorney

UNITED STATES PATENT OFFICE.

HENRY A. ROWLAND, OF BALTIMORE, MARYLAND.

APPARATUS FOR GRINDING SCREWS.

SPECIFICATION forming part of Letters Patent No. 272,480, dated February 20, 1883.

Application filed December 15, 1882. (No model.)

*To all whom it may concern:*

Be it known that I, HENRY A. ROWLAND, of the city of Baltimore, in the county of Baltimore, State of Maryland, have invented a new and useful Improved Apparatus for Grinding Screws, which improvement is fully set forth in the following specification and accompanying drawings, in which—

Figure 1:
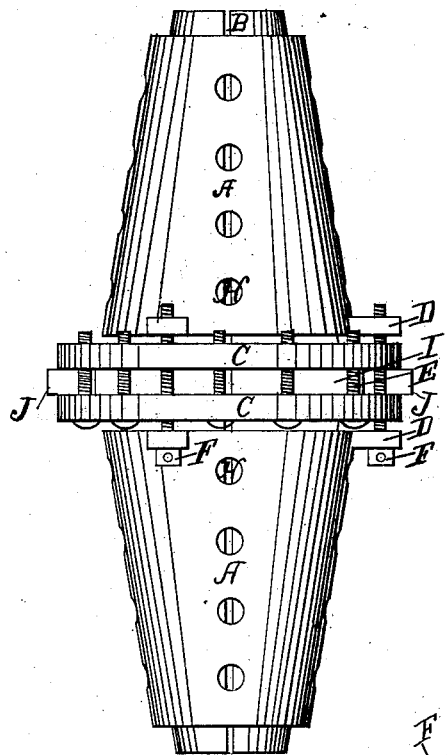
Figure 2:
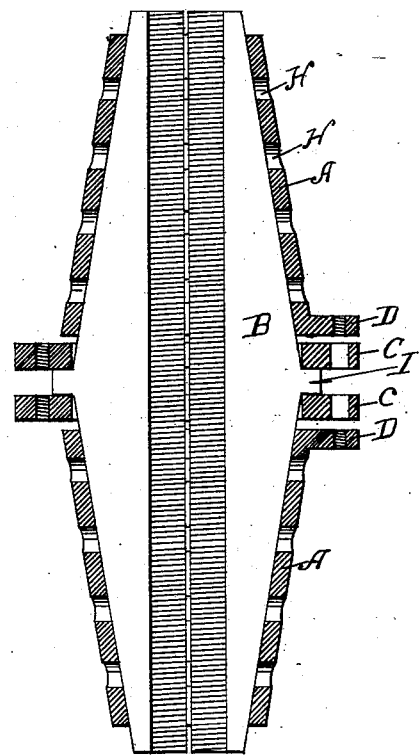
Figure 3:
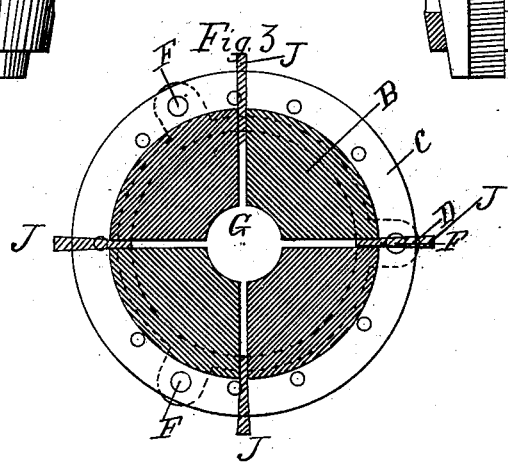

Figure 1 is an external elevation of the improved nut. Fig. 2 is a section of said nut cut by a plane passing through the center and parallel with its axis. Fig. 3 is a section of said nut cut by a plane passing through the center and at right angles to its axis.

My invention consists in a nut, made as hereinafter described, for the purpose of grinding a screw.

Great difficulty has been heretofore experienced by machinists in making a screw free from sensible error, and various means have been adopted for this purpose, but none of them have been altogether successful.

My invention does not relate to the cutting of screws in the first place, but to the grinding and perfecting of them after they have been cut by any of the well-known methods.

In the drawings, A and A are two sleeves, connected together by set-screws F F F, perforated at different points, and fitting closely upon the ends of the double-taper core B.

B is the main portion of the nut, a double-taper hollow core, made of brass or other suitable material, provided with a flange, I, round the middle and divided into any number of segments, with a screw-thread cut on its interior.

C C are two rings, connected by screws E E E, &c., and resting upon the flange I of the double-taper core.

J J J are wedges introduced between the segments of the core B.

H H, &c., are holes cut through the sleeves A A, just over the spaces between the segments of the core B.

It will be seen from the foregoing that when the screws E E, &c., are loosened and the screws F F, &c., tightened the segments of the core will be drawn together. When the bore has reached the desired size the wedges J J, &c., are introduced between the segments, midway of their length, thus checking the further action of the sleeves. If then the screws E E are tightened, clamping the rings C C firmly upon the flange I, the whole will become immovably fixed. If it should become necessary to decrease the size of the bore again, the screws E E, &c., and F F must be loosened and the wedges partially withdrawn, when the above process may be repeated. If, however, it is desired to enlarge the bore, this may be done by simply loosening the two sets of screws and driving the wedges farther in between the segments. These wedges may be substituted by any appliance that will produce the same result.

The screw to be ground is cut upon a rod, leaving the parts of the rod adjacent to the ends of the screw of a less diameter than the screw, so as to allow the movement of the nut longitudinally upon the screw beyond its extremities. The rod is then placed in a lathe, with a vessel of water directly under it, so that the nut, when put on the screw, partially dips into the water, the object being to keep the whole at a uniform temperature. Any other of the well-known means of accomplishing this object may be used. The weight of the nut may be counterbalanced by cord, pulley, and weight, or other suitable means. A mixture of emery and oil is then introduced through the holes H H, &c. As the screw is revolved, first in one direction and then in the other, the nut, being kept from turning, will be caused to move back and forth over it by the action of the screw-threads. The nut is then removed and reversed, constantly tightening it as it wears. This operation is repeated with finer and finer emery until the screw is completed. The object of reversing the nut on the screw is to correct whatever periodic error may have occurred while the nut was in one position— that is to say, the nut may grind the screw while in one position and yet admit an error, which, occurring at the same point of each revolution, does not correct itself, whereas if the nut be reversed the surfaces that formerly coincided and admitted the error will now be exactly opposite to one another. Where formerly there was a concave and a convex surface that, coming together always at the same point, did not correct one another, I will now have a convex and a convex surface coming together, the result of which will be that each will destroy the other. I prefer that the length of the nut be equal to the length of the screw to be ground.

I know that nuts made of various materials—such as lead, plaster, or brass—have been formerly used for the purpose of grinding screws, and I do not claim the nut generally; but that which is new, and that of which I believe myself to be the first inventor, is a nut the wear of which can be taken up by reducing the bore equally from all directions, and, secondly, can at any moment be rigidly fixed throughout its whole length, so as to have no possibility of relative movement of the parts.

Having thus described my invention, what I claim as new, and desire to secure by Letters Patent, is—

1. In an apparatus for grinding screws, the double-taper core B, divided into segments, and having a screw-thread cut upon its inner walls.

2. In an apparatus for grinding screws, the double-taper core B, divided into segments, and having a screw-thread cut upon its interior, provided with means for reducing or increasing the size of the bore.

3. In an apparatus for grinding screws, the double-taper core B, provided with means for setting and maintaining said core in fixed position.

4. In an apparatus for grinding screws, the following elements: the perforated sleeve A A, connected by the screws F F F, passing through the lugs D D D, the double-taper core B, provided with the flange I round its middle, cut with a screw-thread on the interior, and divided into any number of segments, the rings C C, connected together by the screws E E, &c., and the wedges J J, &c., substantially as shown and described.

5. In an apparatus for grinding screws, the following elements in combination: the sleeves A A, the double-taper core B, the rings C C, and the wedges J J J, all substantially as shown and described.

6. In an apparatus for grinding screws, the combination of the sleeves A A, the double-taper core B, and the wedges J J J, all substantially as shown and described.

7. In an apparatus for grinding screws, the combination of the sleeves A A, the double-taper core B, and the wedges J J J, all substantially as shown and described.

HENRY A. ROWLAND.

Witnesses:
ARTHUR STEUART,
JAMES L. STEUART.